United States Patent [19]

Agnew

[11] Patent Number: 4,708,724
[45] Date of Patent: Nov. 24, 1987

[54] HIGH EFFICIENCY PARTICULATE AIR FILTER AND SEPARATORS, THEREFOR

[75] Inventor: Boyd F. Agnew, Rancho Mirage, Calif.

[73] Assignee: Gertrude B. F. Agnew, Rancho Mirage, Calif.

[21] Appl. No.: 862,493

[22] Filed: May 12, 1986

[51] Int. Cl.$^4$ .............................................. B01D 46/04
[52] U.S. Cl. ........................................ 55/500; 55/521
[58] Field of Search ......................... 55/500, 497–499, 55/521; 210/493.1, 493.2, 493.3

[56] References Cited

U.S. PATENT DOCUMENTS

| | | | |
|---|---|---|---|
| 930,561 | 8/1909 | Rahe | 55/484 |
| 3,655,060 | 4/1972 | Hagdahl | 55/500 |
| 3,675,402 | 7/1972 | Weed | 55/496 |
| 4,449,993 | 5/1984 | Bergeron | 55/497 |

FOREIGN PATENT DOCUMENTS

| | | | |
|---|---|---|---|
| 296128 | 1/1917 | Fed. Rep. of Germany | 55/496 |
| 548607 | 10/1922 | France | 55/496 |
| 1022232 | 3/1966 | United Kingdom | 55/521 |

Primary Examiner—Bernard Nozick
Attorney, Agent, or Firm—I. Louis Wolk

[57] ABSTRACT

This invention relates to a pleated high efficiency particulate air filter and separators therefor in which the separators comprise a lattice with flat or rounded spacers, a rounded pleat fold contacting member, and vertically spaced apart air inlet and outlet media supporting flat members to provide uniform internal support for the pleats, and to eliminate sharp edges and corners which would tend to injure the media under compression.

The separators may be formed of plastic by molding into a single unit or into multiple segments which may be joined side by side to provide a desired separator length. The structure permits enclosure and bonding of the assembled pleats and separators with the end portions of each encased by a bonding material.

6 Claims, 14 Drawing Figures

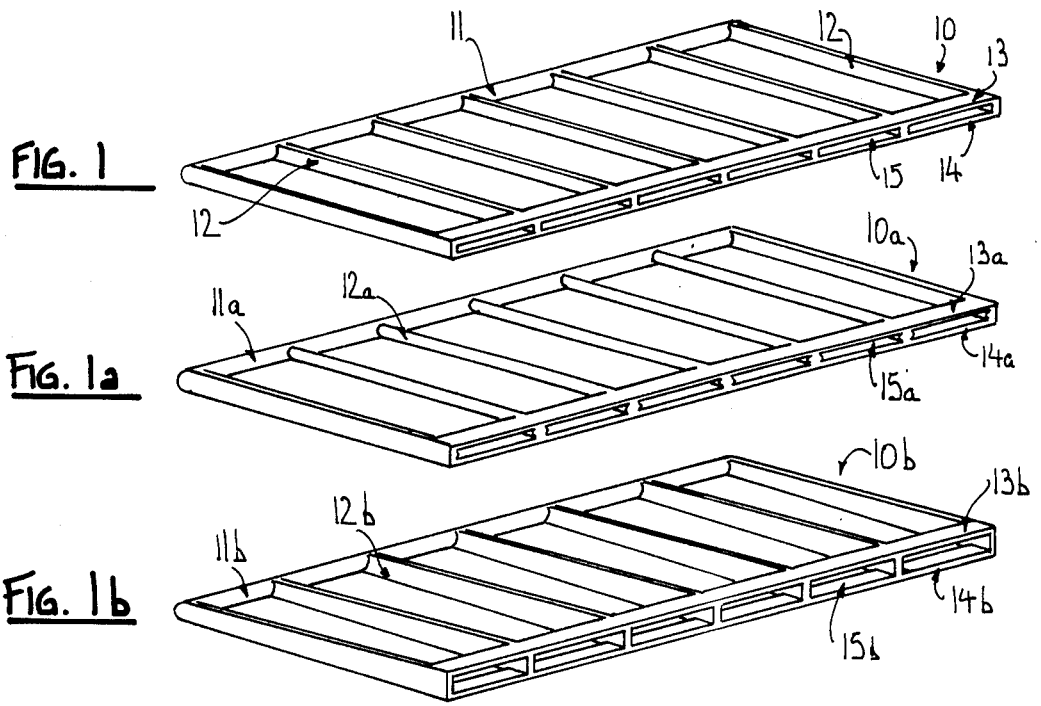
FIG. 1
FIG. 1a
FIG. 1b
FIG. 2
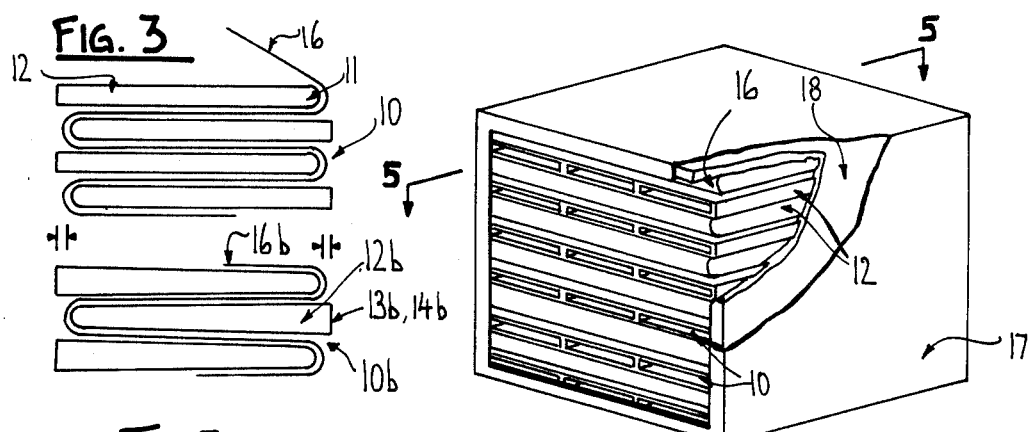
FIG. 3
FIG. 3a
FIG. 4

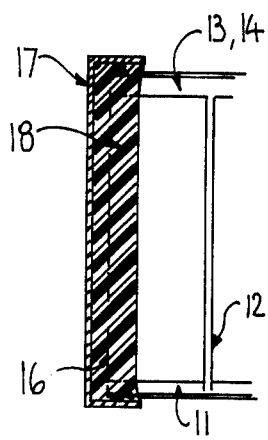
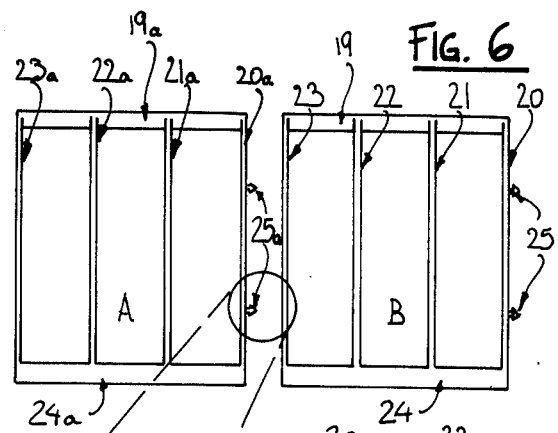
Fig. 5
Fig. 6
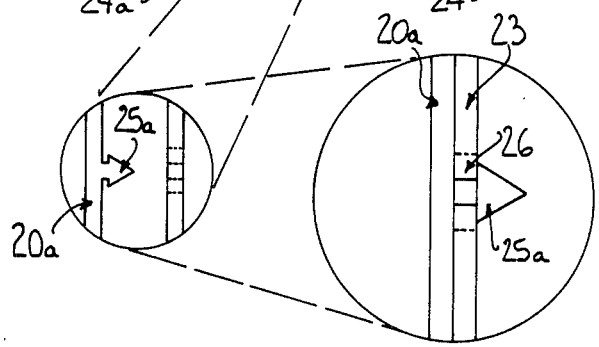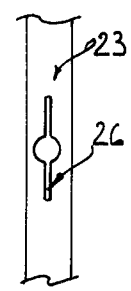
Fig. 6a  Fig. 6b
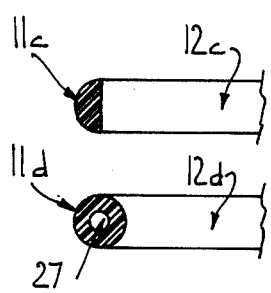
Fig. 7
Fig. 7a
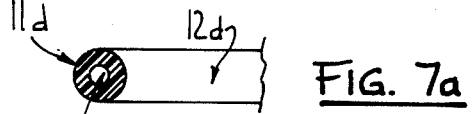
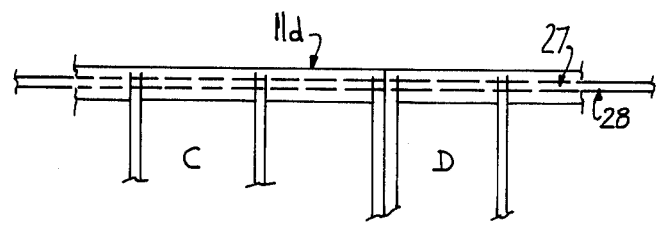
Fig. 8

HIGH EFFICIENCY PARTICULATE AIR FILTER AND SEPARATORS, THEREFOR

BACKGROUND OF THE INVENTION

This invention relates generally to pleated filters and to pleat fold spacers which are interposed between pleats. More particularly, the invention relates to high efficiency particulate air filters known in the industry by the acronym, HEPA. Such filters as well as many types of filters used for various air filtering purposes use a porous or microporous filter medium known to the art such as various types of paper or sheet material composed of non-woven fibers which may or may not be of cellulose, glass or plastic fibers or mixtures thereof.

Such filters are made by folding filter media into pleats incorporating suitable spacers between the pleats and then enclosing the pleated assembly within a suitable enclosure in a manner which retains the pleated filter assembly in a size and shape which is suitable for the use to which it is put.

The structure and characteristics of HEPA filters, especially as used in the nuclear industry are described in the "Nuclear Air Cleaning Handbook" published by Oak Ridge National Laboratory. ERDA 76-21 (Burchsted, et al - NTIS).

Various types of filters and separators as used in the art are described in U.S. Pat. Nos. 3,321,345, 3,871,851, 4,135,900, 4,147,524 and others.

SUMMARY OF THE INVENTION

In accordance with the present invention I have designed a novel type of separator which eliminates any sharp corners and edges and provides only smooth, flat and rounded surfaces in engagement with the media after assembly and which permits assembly of the filter by allowing the pleats to be formed around the separators by positioning the separators against the media during formation of the pleats.

The separator described herein is a lattice or girder assembly formed of a pair of spaced parallel longitudinal members or stringers, joined by means of spaced parallel struts extending in the direction of air flow. The rear stringer around which the pleat is formed is provided with a rounded or contoured surface and may be circular, half round or elliptical in cross section, or the like, so that its contact with the inside of the pleat has no sharp corners. The front stringer which separates the air inlet edges of the media is formed of two thin, flat, narrow members spaced apart vertically by the struts to provide a space between them for entry and exit of air and which provide flat support for the ends of the pleats. In addition, the overall width of the separator is preferably such that the front stringer with the vertically spaced apart strips extends at least to the ends of the pleats and preferably slightly beyond, say up to $\frac{1}{8}$" in order to act as protective buffer for the outer surfaces of the pleat folds. The spaced struts are formed with flat or rounded surfaces so that their contact with the media also avoids sharp edges or corners. The diameter or thickness of the stringers and struts when assembled may be the same from front to back so that when the pleated assembly is compressed and mounted in an enclosure, the thickness of the assembly is uniform throughout.

Alternately, the struts may have a slight uniform taper from a smaller diameter rear stringer to a greater width of the front stringer which permits a larger inlet opening while still providing uniform flat support and an assembly of uniform thickness when the pleats and separators are alternately superimposed. By means of the type of support provided by this separator, the compression forces are transmitted uniformly from pleat to pleat through said material while avoiding injury to the media. This avoids the risk of damage to the media as to friction and abrasion both during assembly and in use as frequently encountered in the case of corrugated or other types of separators having sharp edges or corners which are in direct contact with the media. Due to the fact that the ends of the separators are adhesively bonded to the adjacent inner surfaces of the filter frame, the separator iteself becomes an integral girder like integral part of the assembly and hence greatly increases the ability of the filter to withstand the pressure of air directed at the filter.

In addition, the separator described herein can be formed of multiple standardized sections which can be interlocked or otherwise joined together end to end to permit use for any desired width of media or size of filter.

Because of the rounded structure of the forward stringer, the separator is capable of insertion into the pleat either manually or by machine since it may be forced into engagement against the media along the line of the fold as it is wrapped around the separator during formation of each pleat without any danger of damage to the filter medium.

DESCRIPTION OF THE DRAWINGS

A better understanding of the invention can be obtained by reference to the accompanying drawings in which:

FIG. 1 is an isometric view in perspective of a pleat separator of the type described herein with flat struts.

FIG. 1a is an isometric view in perspective of a pleat separator of the type described with rounded or cylindrical struts.

FIG. 1b is an isometric view in perspective of a pleat separator of the type described with tapered struts.

FIG. 2 is a front edge view of the separator of FIG. 1.

FIG. 3 is a side view of the separator of FIG. 1 or 1a positioned within folds of filter medium.

FIG. 3a is a side edge view of the separator of FIG. 16 positioned within folds of filter medium.

FIG. 4 is an isometric view in perspective of an assembled pleated filter in an enclosure partially cut away at one end to show the structure with the ends of the filter assembly bonded or potted into the frame of the enclosure.

FIG. 5 is a transverse cross sectional view taken along lines 5—5 of FIG. 4 showing the end structure of the filter assembly potted or embedded against the frame.

FIG. 6 illustrates the sectional structure of the separator showing two interlocking segments.

FIG. 6a is an enlarged view of a segment of FIG. 6 showing one form of interlocking arrangement.

FIG. 6b shows the form of locking slot described in FIGS. 6 and 6a.

FIG. 7 illustrates a rounded pleat contacting element of the separator in half-round configuration.

FIG. 7a illustrates a hollow tubular pleat contacting element of the separator.

FIG. 8 illustrates an alternative manner of interlocking segments of the separator using a tubular stringer joined by a rod inserted therethrough.

DETAILED DESCRIPTION OF THE INVENTION

As shown in FIG. 1, the separator 10 is in the form of a lattice or bridged member composed of a rear elongated stringer 11 which is shown as cylindrical in shape or circular in cross section so as to present a curved or contoured edge 11a which will engage the inner fold of a pleat formed in the filter medium as described below. Instead of circular cross section, this member may be round tubular, half round or elliptical in cross section or otherwise shaped so as to present a curved or contoured area for contact with the media. A plurality of parallel spaced transverse members or struts 12 are joined at one end to stringer 11 as shown and at the other end to a front longitudinal member 13, 14 in the form of a pair of flat strips vertically spaced apart as shown at 15. This spacing is provided to permit entry and/or exit of air into or from each pleat for filtration. The depth or thickness of each of the elements 11 and 12 and the thickness of the front ends of the struts with the strips 13, 14 overlaid thereon is designed to be the same so that the assembly with the filter medium will be of uniform thickness. The end portions of the struts 12 are inset sufficiently to allow them to be joined to strips 13, 14 and allow for the thickness of the strips so that the thickness at the front is the same as that at the rear pleat engaging area. At the same time the struts are designed to present a flat surface for engagement and support of the filter media. For this purpose, they may have an "I" cross section rather than rectangular as shown.

FIG. 2 shows the edge of the separator when viewed from the air inlet-outlet position.

The width of the separators are preferably such that the open edge formed by the vertically spaced strips 13, 14 project slightly forward, say ⅛", of the folded pleat so that they can act as bumpers to prevent damage to the pleat folds. This is illustrated by the space lines and arrows which accompany FIGS. 3 and 3a as described below.

In FIG. 1a the separator structure 10a is similar to that in FIG. 1 except that instead of flat surfaced struts in the form of bars or the like, the struts 12a are formed of rounded or cylindrical rods in order to present a surface to the media which is non-injurious along with rounded rear stringer 11a and the vertically spaced front stringer 13a, 14a, as described above.

In FIG. 1b, the struts 12b of separator 10b, while still provided with flat surfaces for support or the media are tapered from the rear stringer 11b to the front so that the front inlet spaces between the spaced flat front stringer members 13b, 14b can be greater to a desired extent.

While the foregoing description of the components of the separator has referred to them as individual units, and while the separator may, if desired, be assembled from such units by cementing or otherwise, in practice it is preferred to form the separator as an integral unit by molding of a rigid plastic such as polystyrene, polymethylmethacrylate (plexiglas), polypropylene or other suitable plastic material. The plastic selected may preferably be fire resistant such as polystyrene U.L. 94V2 grade or better. The separator may also be assembled from separate sections formed of extruded plastic, metal such as aluminum or the like as described further below.

As shown in FIG. 3, the pleats are formed by drawing a sheet 16 of filter medium downward from a roll, the separators 10 are then positioned against the medium with their rounded stringers 11 with their contoured edges held in contact therewith while the medium is folded thereover. This is repeated until the desired number of pleats are formed and the assembly is then compressed together and inserted into a frame which surrounds the ends, top and bottom. The ends of the pleats and separators are potted or bonded into the frame by means of adhesive or the setting of a liquid plastic binder as known to the art.

Similarly, as shown in FIG. 3a, the separators 10b formed with tapered struts 12b as described above may be inserted into the pleat folds of medium 16b with the rounded surfaces of the rear stringer 11b engaging the inner folds of the pleats.

An assembled filter is shown in FIG. 4 partially open at one end in which the separators 10 are positioned within the pleats of filter medium 16 and the pleats and the separators are assembled in frame 17. The edges of the pleats and the end struts 12 may be embedded in a plastic layer 18, or the ends of the stringers and the edges of the pleats may be so embedded where the end struts are not positioned to be embedded.

As shown in FIG. 5, which describes a section along lines 5—5 of FIG. 4, this shows the end portion of the filter assembly embedded or anchored to the frame 17 by means of adhesive or plastic 18 in which the end of the separator including the end of longitudinal stringer 11, and the end of the flat strip 13, 14 along with the edge of filter medium 16 so anchored. The end transverse strut of the separator may also be positioned in the assembly so as to become embedded in the plastic. The same structure, of course, exists at the other side of the assembly. This permits a high degree of rigidity and stability since the entire end structure of the separator including the ends of the stringers, the end edge of the media and the end struts are firmly embedded in the plastic sealant.

The potting of the ends of the filter assembly in the frame may be carried out in various ways. In one procedure the filter assembly is placed within the frame, plastic material such as catalyzed epoxy resin or other type of self setting material such as an elastomeric polymer is poured in at one side and allowed to set-up. Thereafter the other side is treated in the same way.

FIG. 6, 6a and 6b describe a modified separator structure which may be made in separate segment which may be joined together by lateral interlocking means to form separators of any desired length. Shown are a pair of sections or segments A and B each of which is formed with a longitudinal rounded member or stringer 19, 19a, struts 20, 20a, 21, 21a, 22, 22a, 23, 23a and flat longitudinal stringers 24. Each section is provided with a pair of interlocking elements 25, 25a as shown in the form of serrated or notched projections which are formed upon the side edges of end struts 20, 20a designed to enter and engage corresponding slots 26 in an adjacent end strut 23 as shown in the enlarged segment as illustrated in FIGS. 6a and 6b.

Any other type of assembly means may be used instead of the bayonet and slot means described. After assembly of a desired number of segments, the projections on the end unit may be broken or cut prior to assembly in the filter frame.

FIGS. 7 and 7a show alternate forms of the rounded inner pleat contacting stringers 12c and d corresponding to element 11 of FIG. 1, in which 11c is a member with a half round cross section and 11d is a hollow round or cylindrical tubular member with a hollow core 27.

An alternate means of joining separate segments of the separator is shown in FIG. 8 in which the pleat contacting stringer of the separator is in the form shown in FIG. 7a. In this modification advantage is taken of the hollow tubular structure of the rear stringer by forming the separator in separate segments and joining the segments by inserting a rod 28 which extends through the core 27 of the tubular member in the segments to be joined as shown. In this form segments C and D are shown in which each is formed with tubular stringer 11d joined together by inserting the rod 28 as shown. This permits the joined segments to be inserted as a unit into the pleat folds while the opposite stringers are held in place manually or otherwise during assembly.

Filters of the type described are most commonly made in certain standard configurations which may be assembled in multiple for given usages. In such filters standard dimensions of the separators will be either 5¼" or 10½" in width and 24", 30", 36" or 48", or more in length, the rounded stringers and struts 3/16" in vertical thickness with the struts having upper and lower flat bearing surfaces of about ⅛" in width. Where the struts are of rounded cross section, they will have a corresponding diameter for uniform support. The spacing of the transverse struts may vary depending upon the size of the filter and the conditions of use but in most cases will be from 1" to 4" apart. Where a tubular stringer member is used, its O.D. may be 3/16" and I.D. may be 1/16-⅛". Of course, other dimensions may be provided where a different pleat separation space is required.

One common type of filter media is in the form of non-woven paper formed on a fourdrinier machine, incorporating micro glass fibers and having an acrylic resin binder. The media may have any desired thickness but 0.015" to 0.020" is usually used.

The flat strips forming the air inlet and outlet stringers of the separator may be ¼"-⅜" in width and about 1/32" in thickness. Where the overall thickness of the separator is 3/16", this would provide a space of ⅛" between upper and lower strips of the stringer for admission and exit of air.

As described herein, I have provided an improved HEPA filter that represents an advance in the art in several respects as follows:

There are no sharp corners to bite into the filter media, as is the case with the aluminum foil separators in common use today. Instead, the struts connecting the top rails with the bottom rail take only the air pressure that tends to push the pleats together from the upstream side to the downstream side. The pressure of compressing the pleats together after the pack is formed is transmitted from top rails, through direct contact with successive layers of media to the bottom rails from one end of the pack to the other. This avoids the constant sawing action of the corrugations of the corrugated foil type separators of the prior art against the media that occurs through shock, vibration, and the surges that occur whenever the air pressure is turned off and on again.

Other pleat supporting means such as cords or longitudinal strips or stripes of glue, plastic, etc., will only keep the pleats apart where the width of the pleat is no greater than about 3", whereas in the present structure, where the lateral separators are provided, pleats of almost any width may be utilized.

The pressure of the air against the face of the filter is borne by the separators, which in turn transmit this force to the filter frame itself, in contrast to the way filters are built today, where this force is borne by the media itself. In today's state-of-the-art, the shape of the pleat, forming a deep channel, enables it to bear this force up to a certain extent, but as the pressure increases, the separators, which, because of their corrugated shape, are extremely flexible and begin to deform, and as they do so, the channel shape begins to sag out of form, and at a critical point, the filter pack will blow out. Other types of separators which have sharp edges are also unsuitable as are various types of cords or longitudinal strips which fail to provide uniform support of the type described herein.

Ease of manufacture with metal foil separators, the usual practice is to insert them by hand into pleats made purposely too long. The corrugated separators are themselves cut too long. After the pack has been filled with separators on one side, the entire assembly is turned over, and a corrugated separator is carefully slipped into position in each pleat on the other side. The pack is then sawed to the correct width. This results in a great deal of waste material.

In my process, by contrast, the media is trimmed to finished width, and the pleats with separators can be lowered into an assembly jig and compressed for positioning in a frame without risk of damage to the filter medium.

The filters are much sturdier, not damage prone. The top twin rails, which form slots for the air to enter and leave the pleats, act like bumpers to protect the fragile media. In the case of the foil separators, the projecting corrugations are easily deformed by the slightest contact. These mashed areas are often sources of leaks caused by the media being punctured by the foil as it is bent out of position.

I claim:

1. A separator for pleated air filters which comprises a lattice having a pair of spaced parallel longitudinal members one of which has a rounded outer surface adapted to engage the inner surface of a pleat fold and the other of which is composed of a pair of superimposed vertically spaced apart flat strips, adapted to support the ends of a pair of superimposed pleats, and a plurality of laterally spaced apart transverse strut members joining said longitudinal members said strut members having flat or rounded upper and lower surfaces thereon for engagement with the pleat surfaces, said separator comprising a plurality of sections joined side by side at the ends of said longitudinal members by interlocking engagement.

2. A separator according to claim 1 wherein adjacent segments are joined by bayonet and slot means.

3. A separator according to claim 1 wherein the longitudinal pleat engaging member in each segment is in the form of a hollow tube and the segments are joined by means of a rod extending through the tube in each segment.

4. A pleated filter comprising a plurality of pleats of a filter medium formed around a plurality of separators, each of said separators comprising a lattice member having a pair of parallel longitudinal spaced members one of which positioned at the rear of each pleat has a rounded surface in engagement with the inner surface of the pleat fold and the other of which is positioned at the air entry position of the pleat and is composed of a pair of superimposed vertically spaced apart flat strips the upper and lower surfaces of which are in engagement with the open edges of the pleat to permit the entry of air to be filtered therebetween, said longitudinal members being joined by a plurality of spaced apart transverse struts each having a flat or rounded upper and lower surface in engagement with the inner surfaces of said pleat.

5. A pleated filter according to claim 4 wherein the front longitudinal members of the separators composed of a pair of vertically spaced apart strips project beyond the folds of each pleat in order to project said folds against injury.

6. A pleated filter according to claim 4 wherein the superimposed pleats and separators are positioned within an enclosure with the pleated sides and the ends of the separators bonded to the sides of said enclosure by means of a solidified plastic material.

* * * * *